United States Patent
Bestle et al.

(10) Patent No.: US 8,591,128 B2
(45) Date of Patent: Nov. 26, 2013

(54) EXTENDABLE MECHANISM

(75) Inventors: Nikolaj Heiberg Bestle, Copenhagen (DK); Teppo Tapani Jokinen, Espoo (FI)

(73) Assignee: Nokia Corporation, Espoo (FI)

( * ) Notice: Subject to any disclaimer, the term of this patent is extended or adjusted under 35 U.S.C. 154(b) by 544 days.

(21) Appl. No.: 12/580,099

(22) Filed: Oct. 15, 2009

(65) Prior Publication Data

US 2011/0002092 A1 Jan. 6, 2011

Related U.S. Application Data

(60) Provisional application No. 61/222,152, filed on Jul. 1, 2009.

(51) Int. Cl.
  *B41J 5/10* (2006.01)
  *G06F 3/02* (2006.01)

(52) U.S. Cl.
  USPC ...... 400/472; 400/492; 345/169; 361/679.11; 361/679.14

(58) Field of Classification Search
  USPC ......................................... 400/472
  See application file for complete search history.

(56) References Cited

U.S. PATENT DOCUMENTS

| | | | | |
|---|---|---|---|---|
| 5,034,602 A | * | 7/1991 | Garcia et al. | 345/170 |
| 5,141,343 A | * | 8/1992 | Roylance et al. | 400/472 |
| 5,151,946 A | * | 9/1992 | Martensson | 455/575.4 |
| 5,574,481 A | * | 11/1996 | Lee | 345/168 |
| 5,907,615 A | * | 5/1999 | Kaschke | 379/433.12 |
| 5,951,178 A | * | 9/1999 | Lim | 400/472 |
| 6,068,417 A | | 5/2000 | Butler | |
| 6,629,794 B2 | * | 10/2003 | Cauwels | 400/472 |
| 6,707,664 B2 | * | 3/2004 | Murphy | 345/167 |
| 6,830,397 B2 | * | 12/2004 | Lahr | 400/492 |
| 7,076,058 B2 | * | 7/2006 | Ikeuchi et al. | 455/575.4 |
| 7,104,715 B2 | * | 9/2006 | Lahr | 400/472 |
| 2003/0156878 A1 | | 8/2003 | Cauwels | |
| 2005/0146498 A1 | | 7/2005 | Hemia et al. | |
| 2006/0061555 A1 | | 3/2006 | Mullen | |
| 2007/0153461 A1 | | 7/2007 | Singh et al. | |

FOREIGN PATENT DOCUMENTS

WO 0054479 A2 9/2000
WO 2008057785 A2 5/2008

OTHER PUBLICATIONS

International Search Report and Written Opinion, received in corresponding Patent Cooperation Treaty Application No. PCT/IB2010/001616, Dated Oct. 27, 2010. 15 pages.

* cited by examiner

*Primary Examiner* — Jill Culler
(74) *Attorney, Agent, or Firm* — Harrington & Smith

(57) ABSTRACT

In accordance with an example embodiment of the present invention there is provided an apparatus comprising a first assembly and a second assembly, said first assembly being connected to said second assembly by and extendable mechanism, said extendable mechanism being configured to extend an input area when the first assembly is moved with respect to the second assembly from a first position to a second position.

7 Claims, 7 Drawing Sheets

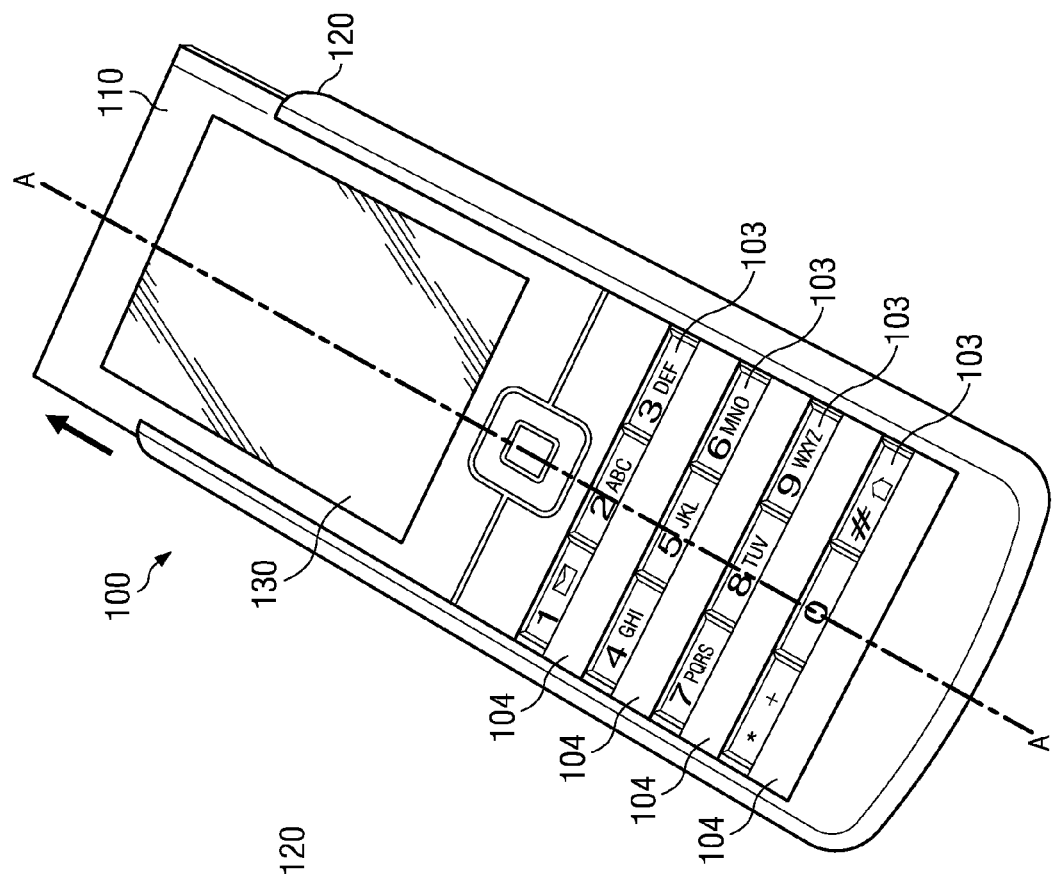
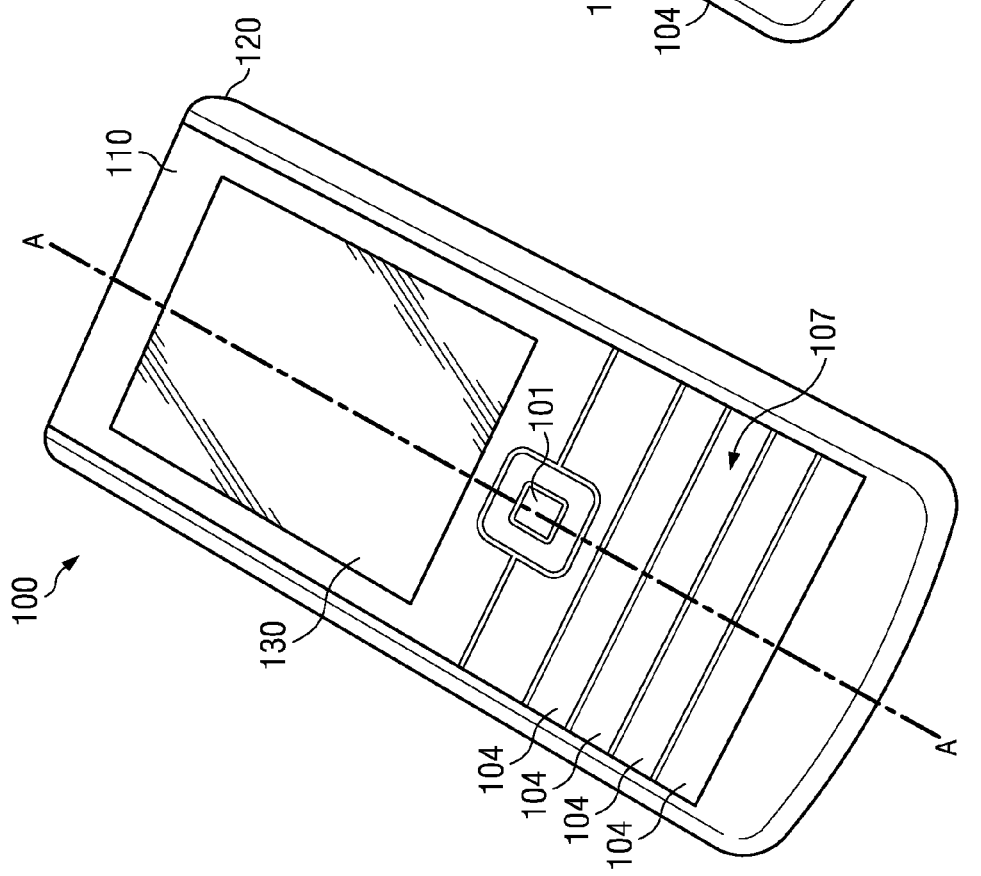
FIG. 2b
FIG. 2a

EXTENDABLE MECHANISM

RELATED APPLICATION

This application claims priority to U.S. Provisional Application No. 61/222,152 filed Jul. 1, 2009, which is incorporated herein by reference in its entirety.

TECHNICAL FIELD

The present application relates generally to electronic devices and more particularly to an extendable mechanism suitable for application in an electronic device.

BACKGROUND

One demand for an electronic device has been a small size that enables a convenient portability for a user.

SUMMARY

In accordance with a first aspect of the present invention, there is provided an apparatus comprising a first assembly and a second assembly, said first assembly being connected to said second assembly by an extendable mechanism, said extendable mechanism being configured to extend an input area when the first assembly is moved with respect to the second assembly from a first position to a second position.

In accordance with a second aspect of the present invention, there is provided an extendable mechanism for an electronic device, the extendable mechanism comprising a first set of arm-like elements and a second set of arm-like elements, arm-like elements of the first set being movably interconnected with corresponding arm-like elements of the second set to form an extendable grid, said extendable grid being configured to extend an input area of the electronic device.

In accordance with a third aspect of the present invention, there is provided a keyboard comprising an extendable mechanism according to the second aspect of the invention.

BRIEF DESCRIPTION OF THE DRAWINGS

For a more complete understanding of example embodiments of the present invention and potential advantages thereof, reference is now made to the following descriptions, taken in connection with the accompanying drawings in which:

FIG. 2a depicts the electronic device of FIG. 1 in a first, substantially closed position;

FIG. 2b depicts the electronic device of FIG. 1 in a second, substantially open position;

DETAILED DESCRIPTION OF THE DRAWINGS

Example embodiments of the present invention and their potential advantages are best understood by referring to FIGS. 1 through 5 of the drawings.

Figure 1:
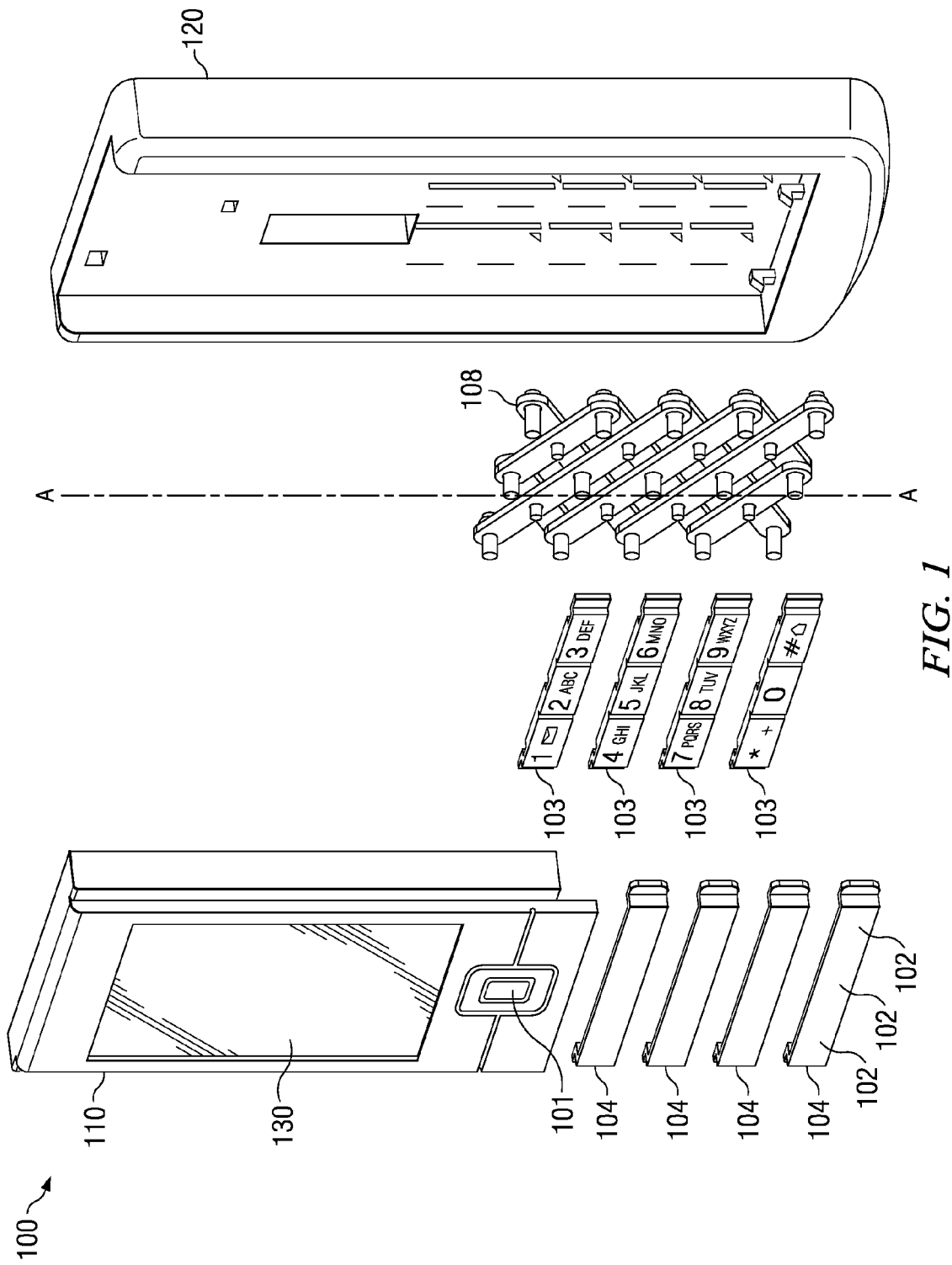
FIG. 1 is an exploded view depicting an electronic device assembly according to an example embodiment of the invention.

FIG. 1 is an exploded view depicting an electronic device assembly according to an example embodiment of the invention. In the Figure, the electronic device is referred to in general by reference numeral 100. It should be noted that although the electronic device illustrated in FIG. 1 and described in greater detail in this specification is in the form of a slider-type mobile communication device, such as a mobile telephone, this type of device is merely illustrative of one type of electronic device that may employ embodiments of the present invention. Therefore, this particular example should not be taken to limit the scope of the inventive concept described herein, nor the type of device in which embodiments of the invention may be applied. Other types of electronic device 100, such as portable digital assistants (PDAs), pagers, laptop computers, desktop computers, computer keyboards, the keyboards of electronic musical instruments, gaming devices, portable televisions, MP3 players, and many other types of electronic systems, may also employ embodiments of the present invention.

Considering FIG. 1 in detail, it can be seen that electronic device 100 comprises a first assembly 110 and a second assembly 120. The first and second assemblies 110, 120 are configured to slide with respect to each other along longitudinal axis A-A. In the illustrated embodiment, the first assembly 110 comprises at least a display 130 and a navigation key 101. In alternative embodiments the display 130 and navigation key 101 may be provided in the second assembly 120 and other components, for example a central processing unit, a radio transceiver unit and an antenna assembly may be provided in either the first assembly 110 or the second assembly 120, or distributed between the two assemblies. Materials that may be used in the construction of both or either of the first assembly 110 and second assembly 120 may comprise for example plastic, metal and precious metal, recycled materials, for example aluminum, rubber, ceramics, tempered glass and organic materials for example wood, leather or any other suitable material.

Electronic device 100 further comprises a number of keys 102 and corresponding key graphic panes 103, the key graphic panes 103 carrying respective indications of one or more function(s) that may be performed by activation of the corresponding key 102. Together, the keys 102 and key graphic panes 103 form a keyboard assembly for enabling user input. In the illustrated embodiment, the keys 102 are grouped together as "key-rows" 104, each key-row 104 being formed e.g. from a single piece of material and comprising more than one distinct area, each distinct area corresponding to a particular key 102. In alternative embodiments, the keys may be implemented as separate individual elements, each separate individual element corresponding to one key 102. In the embodiment illustrated in FIG. 1, where the keys 102 are grouped together as key-rows 104, the key graphic panes 103 may also be grouped together in a corresponding manner and may be formed, for example, from a sheet of flexible material, e.g. a molded rubber sheet, or may take the form of strips of material, each strip corresponding to a particular one of the key-rows 104. The keys 102/key-rows 104 may be made, for example, from the same material as the first assembly 110, or the second assembly 120.

Each of the keys 102, whether provided as a distinct area of a larger key-row 104, or as a separate individual element, is configured such that when pressed, for example by a user of the device, the key press causes a certain function to be performed. Such functions may comprise, for example, entry of an alphanumeric character, navigation through a menu tree, selection of a menu item, or a control function associated with operation of the electronic device, for example capturing of an image by a built-in digital camera unit, a power-on/power-off/standby function or locking/unlocking of the keys. The functions associated with any one or all of the keys may be configurable, e.g. by a user of the device.

In a particular example embodiment, and as illustrated in FIG. 1, the keys and key graphic panes may be arranged in the form of a standard keypad for entering telephone numbers and associated text information (e.g. for text messaging), such as that specified by the International Telecommunications Union Standardisation Sector (ITU-T) recommendation E.161 "Arrangement of digits, letters and symbols on telephones and other devices that can be used for gaining access to a telephone network". In another embodiment, electronic device 100 may comprise a numeric keypad only. In a further embodiment, electronic device 100 may comprise a keyboard suitable for full alphanumeric text entry, such as any of the variants of the familiar "QWERTY" keyboard, or any equivalent arrangement that allows full text entry in a particular language or languages. In still further embodiments, electronic device 100 may comprise any combination different keypads/keyboards, including, but not limited to a standard keypad for entering telephone numbers and associated text, as specified by ITU-T E.161, a numeric keypad and a QWERTY keyboard (or equivalent) for text entry, any or all of which may be implemented as described herein.

Referring again to FIG. 1, the key-rows 104 and the key graphic panes 103 are movably coupled to an extendable mechanism 108, which is capable of changing its length in at least one dimension. In the illustrated embodiment, extendable mechanism 108 connects at one end to the first assembly 110 of electronic device 100 and connects at its other end to the second assembly 120 of electronic device 100. Due to the coupling between the extendable mechanism 108 and the first and second assemblies (110, 120), movement of the first and second assemblies with respect to each other along longitudinal axis A-A also causes extension (increase in length) or contraction (decrease in length) of the extendable mechanism 108 along the same axis A-A. The key-rows 104 and key graphic panes 103 are coupled with the extendable mechanism 108 in such a way that extension or contraction of the extendable mechanism along longitudinal axis A-A causes relative motion of the between the key-rows 104 and the key graphic panes 103. More specifically, in the illustrated embodiment, the key-rows 104 are configured to move in front of the key graphic panes, either causing the key graphic panes 103 to be revealed (when the first and second assemblies 110, 120 are slid away from each other along axis A-A, causing extension of the extendable mechanism) or concealed (when the first and second assemblies 110, 120 are slid towards each other along axis A-A, causing contraction of the extendable mechanism). Details of the coupling between the keys/key-rows and the extendable mechanism 108 are provided in connection with the description of FIGS. 4a to 4f.

FIG. 2a depicts the electronic device of FIG. 1 in a first, substantially closed position. In the illustrated embodiment, the key-rows 104 are made from opaque material, for example the same material used to fabricate either the first or the second assemblies 110, 120. Therefore, in the closed position, the key graphics panes 103 are completely hidden behind the key rows 104. In alternative embodiments, the key rows may be made from transparent or partially transparent material such that in the closed position, the key graphics panes 103 are completely covered by the key rows 104, but can still be seen through the key-rows 104. In further alternative embodiments, the key graphics panes 103 may only be partly obscured by the key-rows 104 in the substantially closed position.

In embodiments where the keygraphics 103 are completely covered by the key rows 104 in the substantially closed position, the key-rows 104 form a unitary cover element 107, for example a planar surface, as illustrated in FIG. 2a. The unitary cover element 107 may create new styling possibilities for the electronic device 100. For example, different graphics or text may be applied to the surface of the key rows, such that when the electronic device 100 is in the substantially closed position, the graphics on the respective key-rows 104 form a unitary figure, icon or design. In embodiments in which text is applied to the key-rows 104, the individual parts of text applied to the respective key-rows may join to together to form a sentence, phrase or a logo, for example, when the electronic device is in the substantially closed position.

FIG. 2b depicts the electronic device of FIG. 1 in a second, substantially open position. Transition from the substantially closed position illustrated in FIG. 2a to the substantially open position illustrated in FIG. 2b is affected by sliding the first assembly 110 away from the second assembly 120 along longitudinal axis A-A, as indicated by the arrow in FIG. 2b. As can be seen from the Figure, in the illustrated embodiment, the key graphics panes 103 are fully exposed when the electronic device is in the open position. In alternative embodiments, the key graphics panes 103 may be only partly exposed, or intermediate positions may be provided, in which the key graphics panes 103 are only partly exposed.

As will be explained in greater detail in connection with FIG. 4b, in embodiments of the invention, the keyboard may be configured to become active only when the electronic device 100 is in the substantially open position. In the illustrated embodiment, key entries corresponding to functions indicated by the key graphics panes 103 may then be made by pressing the sections of the key-rows 104 immediately below the graphic pane 103 in question. For example, the number "1" may be entered by pressing the section (key) of the key-row 104 immediately under the key graphic pane which carries the number "1". When the electronic device is placed into the closed position by sliding the first assembly 110 towards the second assembly along axis A-A, the keyboard may be configured to transition into an inactive or "locked" condition in which no, or only a limited number of specific key entries may be made.

Figure 3B:
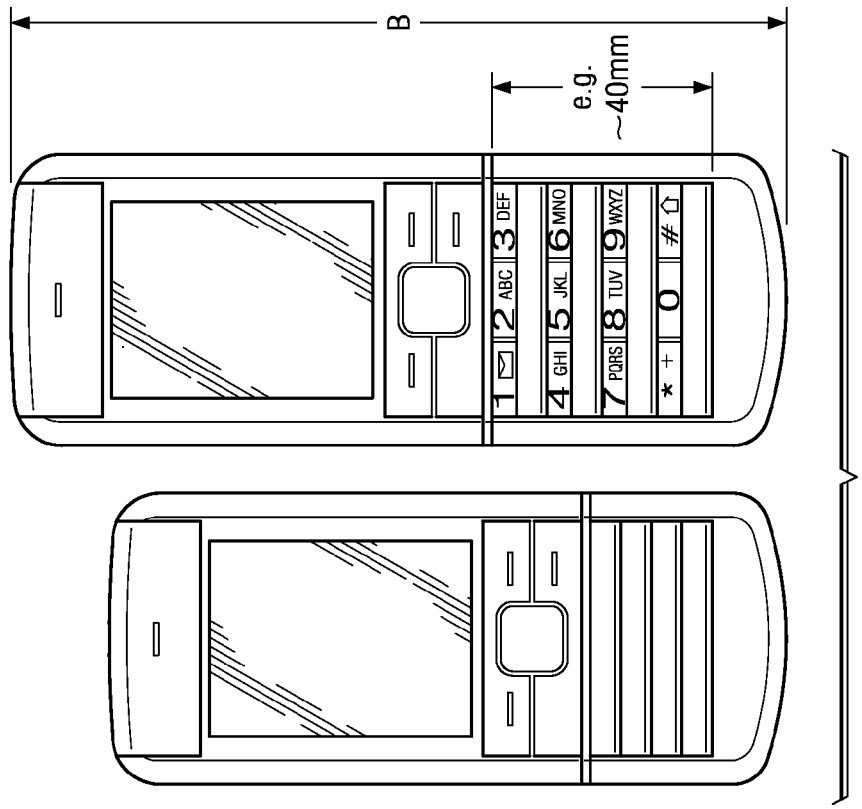
FIG. 3b illustrates a mobile telephone employing a keyboard assembly implemented according to an example embodiment of the present invention in a closed configuration and in an open configuration.
Figure 3A:
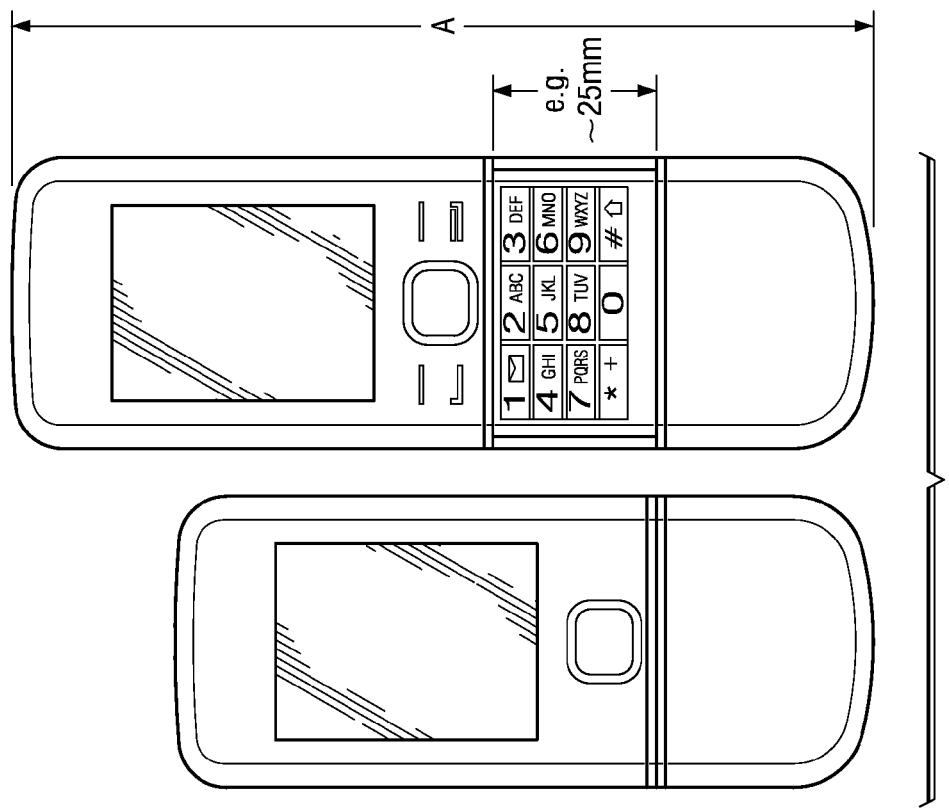
FIG. 3a illustrates a known "pop-up" type mobile telephone, in a closed configuration and in an open configuration.

Some technical effects of the expandable keyboard assembly illustrated in FIGS. 1 and 2 may be appreciated by comparing FIGS. 3a and 3b, which are drawn to the same scale for comparison. Again taking mobile communication devices as an example of electronic devices 100 in which embodiments of the invention may be implemented, FIG. 3a illustrates a known "pop-up" type mobile telephone, in a closed configuration and in an open configuration. FIG. 3b illustrates a mobile telephone employing a keyboard assembly implemented according to an example embodiment of the present invention in a closed configuration and in an open configuration. Comparing the left-hand drawing of FIG. 3a with the left-hand drawing of FIG. 3b, it can be seen that in the closed position both the known pop-up type mobile telephone and the mobile telephone implemented according to an embodiment of the invention are approximately the same length in the closed position. However, referring to the right-hand drawings of FIGS. 3a and 3b and comparing dimension B with dimension A, it can be seen that when open, the mobile telephone implemented according to an embodiment of the invention is considerably shorter than the known pop-up telephone (dimension B is less than dimension A). Furthermore, compared with the known pop-up device, the effective keyboard area of the new device is larger. For example, it is estimated that embodiments of the invention may enable the length of an ITU-T E.161 standard keyboard, suitable for implementation, e.g. in a mobile telephone, to be increased from approximately 25 mm to approximately 40 mm. Additionally, due to the arrangement of the key-rows 104 and key graphic panes 103 such that the active key area corresponding to a given key graphic pane is located below the key graphic pane in question, the key graphics remain visible even when the corresponding key area is being pressed. Both the comparative increase in the size of the keyboard and the improved visibility of the key graphics may provide significant ergonomic improvements for a user of a mobile communication device. At the same time, the overall dimensions of the device may correspond with those of known devices. This means that ease of use and convenience may be increased without a penalty in terms of an overall increase in size. In effect, implementation of a keyboard assembly according to an embodiment of the invention in a mobile communication device may create a new form factor: a device hybrid between a monoblock, fixed format device and a slide or pop-up type device.

Implementation details of an extendable mechanism 108 in accordance with an example embodiment of the invention will now be discussed with reference to FIGS. 4a and 4b.

Figure 4A:
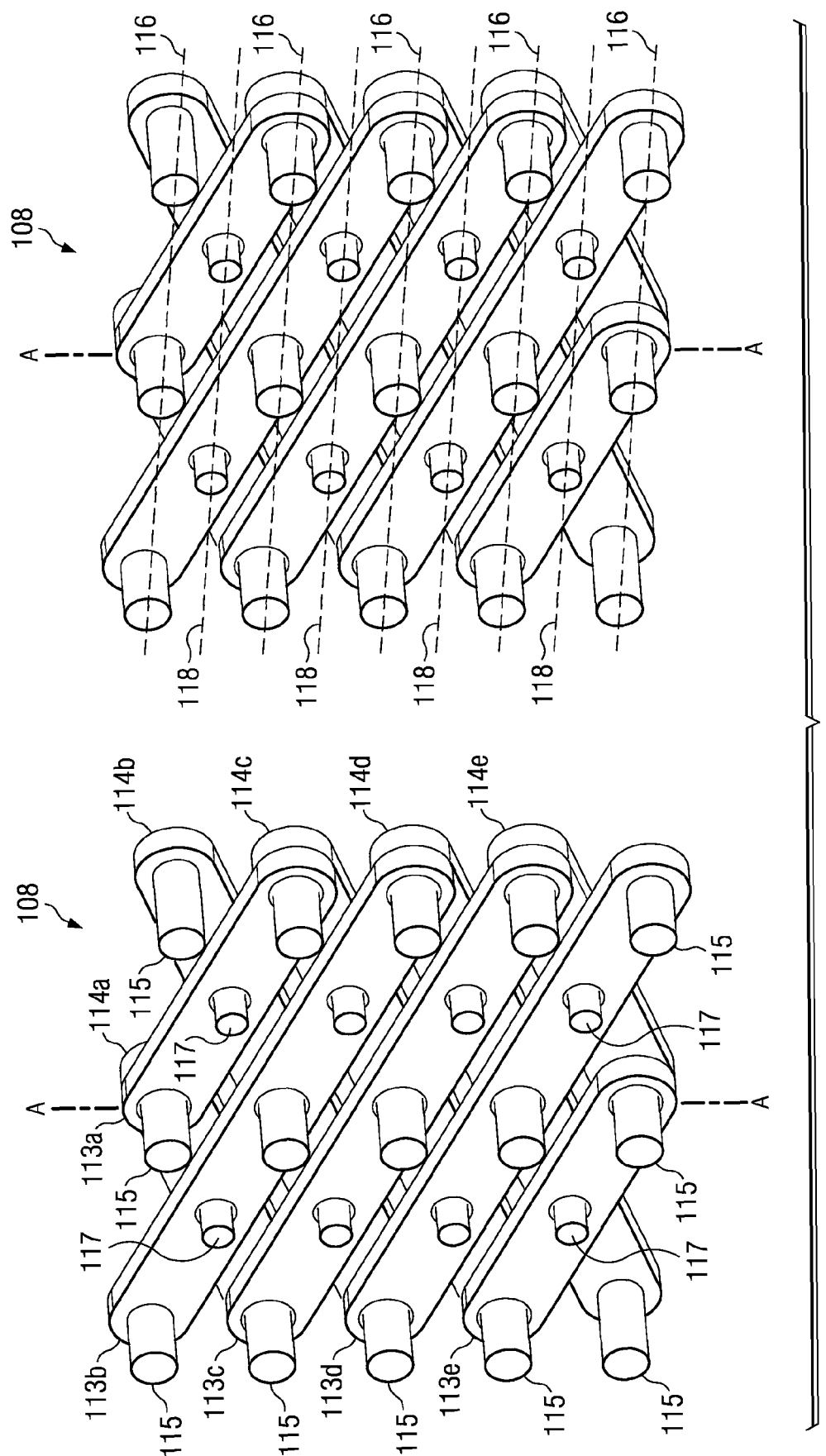
FIG. 4a presents a perspective view of an extendable mechanism according to an embodiment of the invention, viewed from the front.

FIG. 4a presents a perspective view of an extendable mechanism according to an embodiment of the invention, viewed from the front. As can be seen from the Figure, the extendable mechanism 108 comprises two sets of movably interconnected arm-like elements, a first set comprising elements 113a-113e, a second set comprising elements 114a-114e. The two sets of arm-like elements 113a-113e and 114a-114e are coupled to one another in an overlapping, diagonally-opposing arrangement to form a substantially planar grid. The arm-like elements of the first set, 113a-113e, are oriented substantially parallel to each other and form a first, or front layer of the grid. Correspondingly, the arm-like elements of the second set, 114a-114e are oriented substantially parallel to each other and form a second or rear layer of the grid, which is diagonally-opposed to the first layer. The arm-like elements of the two sets 113a-113e and 114a-114e are coupled to each other at pivot points by axles 115 which allow the arm-like elements 113a-113e and 114a-114e to pivot with respect each other, in a scissor like movement. This allows the grid to change length (e.g. either elongate or contract) along axis A-A when a force is applied along that axis.

In the illustrated embodiment, the axles 115 take the form of substantially cylindrical rods that are an integral part of (or alternatively are rigidly attached to) the arm-like elements 114a-114e of the second set. In alternative embodiments, the axles 115 may take the form of pins or screws or any other coupling mechanism that will allow pivoting movement between the arm-like elements 113a-113e, 114a-114e of the first and second sets. In the illustrated embodiment, the axles 115 pass through corresponding holes provided in the arm-like elements 113a-113e of the first set at the pivot points and protrude a predetermined distance above the surface of the grid.

Due to the diagonally-opposed arrangement of the arms, the protruding axles 115 at the pivot points form substantially linear rows 116. Each row of protruding axles 116 is configured to couple with a corresponding key-row 104. As can be seen in FIGS. 4c and 4e, the rear surface of each key row 104 is provided with one or more elongated grooves 109a configured to accept one or more of the axles 115. The connection between the rows of axles 116 and the key-rows 104 means that elongation and contraction of the grid also causes corresponding movement of the keys. More specifically, elongation of the grid along axis A-A causes separation of adjacent key-rows 104 and, correspondingly, contraction of the grid along axis A-A causes adjacent key-rows 104 to approach each other.

In the embodiment illustrated in FIG. 4a, the arm-like elements 114a-114e that form the lower layer of the grid (the second set of arm-like elements) comprise further protrusions 117. In the illustrated embodiment, the further protrusions 117 take the form of substantially cylindrical rods that are an integral part of (or alternatively are rigidly attached to) the arm-like elements 114a-114e of the second set. The further protrusions 117 are arranged on the arm-like elements 114a-114e, between the axles 115. In the illustrated embodiment, one further protrusion 117 is located substantially half-way between each pair of axles 115. The arm-like elements 113a-113e that form the upper layer of the grid comprise corresponding holes which allow the further protrusions 117 to pass through the arm-like elements of the upper layer 113a-113e. The further protrusions 117 are sufficiently long to pass through the holes provided in the arm-like elements 113a-113e of the first set and to protrude a predetermined distance above the surface of the grid. However, the further protrusions 117 are configured to protrude less than the axles 115.

Due to the diagonally-opposed arrangement of the arms, the further protrusions 117 also form substantially linear rows 118. Because of their location between the axles 115, the rows 118 formed by the further protrusions 117 are located between the rows 116 formed by the axles 115. More specifically, in the illustrated embodiment in which the further protrusions 117 are located on the arm-like elements 114a-114e substantially half-way between the axles 115, each row 118 of further protrusions 117 is formed substantially half-way between the corresponding rows 116 of axles 115.

Each row 118 of further protrusions 117 is configured to couple with a corresponding key graphic pane 103. As illustrated in FIGS. 4c and 4e, the rear surface of each key graphic pane 103 is provided with one or more elongated grooves 109b configured to accept one or more of the further protrusions 117. The connection between the rows 118 of further protrusions 117 and the key graphic panes 103 means that elongation and contraction of the grid also causes corresponding movement of the key graphic panes 103. Thus, elongation of the grid along axis A-A causes separation of adjacent key graphic panes 103 and, correspondingly, contraction of the grid along axis A-A causes adjacent key graphic panes 103 to approach each other. However, because of the location of the further protrusions 117 between the axles 115, as the grid expands or contracts along axis A-A, the distance traveled by the rows 116 of axles 115 and the rows 118 of further protrusions 117 is not the same. Thus, extension or contraction of the grid along axis A-A produces relative movement between the key-rows 104 and the key graphic panes 103, the key-rows 104 moving further than the key graphic panes 103. Furthermore, since the axles 115 are configured to protrude further above the surface of the grid than the further protrusions 117, the key-rows 104, which are coupled to the rows 116 of axles 115 are able to slide over the key graphic panes 103, which are coupled to the rows 118 of further protrusions 117. The resulting technical effect is that when the electronic device 100 is slid open from a substantially closed position to a substantially open position, the extendable mechanism 108 extends from a retracted position to an extended position, at the same revealing the key graphic panes 103 from behind the key-rows 104.

Figure 4B:
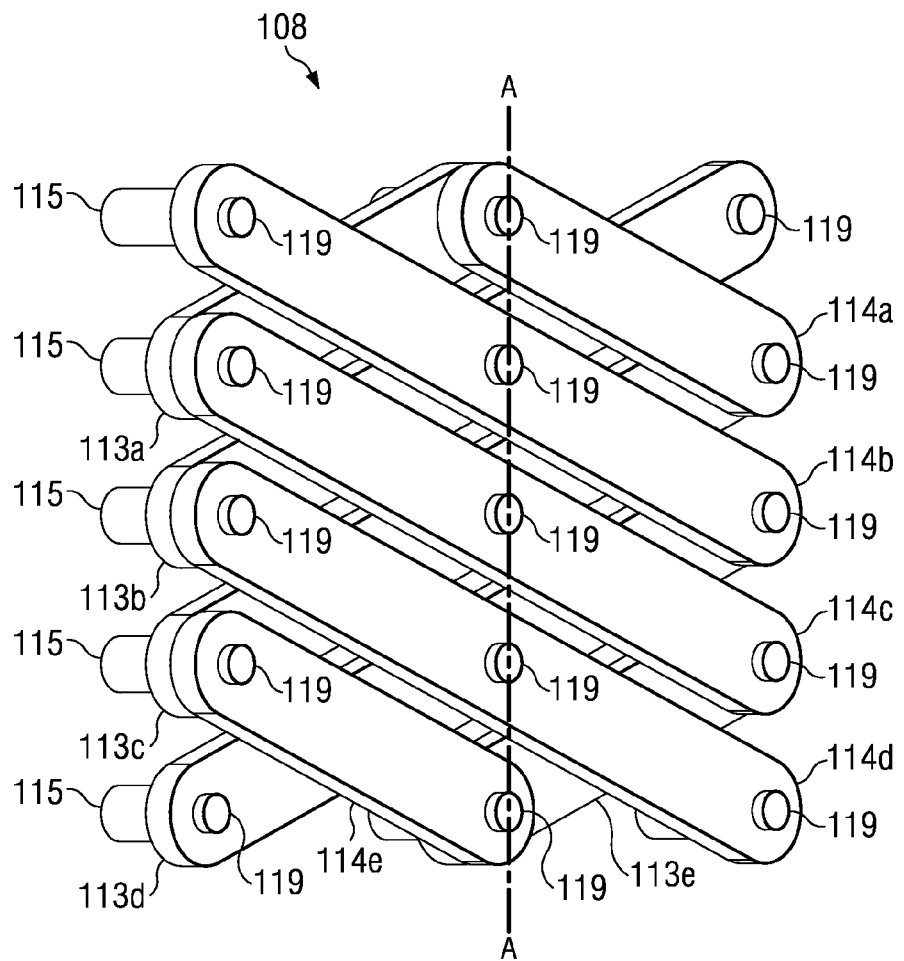
FIG. 4b presents a perspective view of an extendable mechanism according to the embodiment of FIG. 4a, viewed from the rear.
Figure 4C:
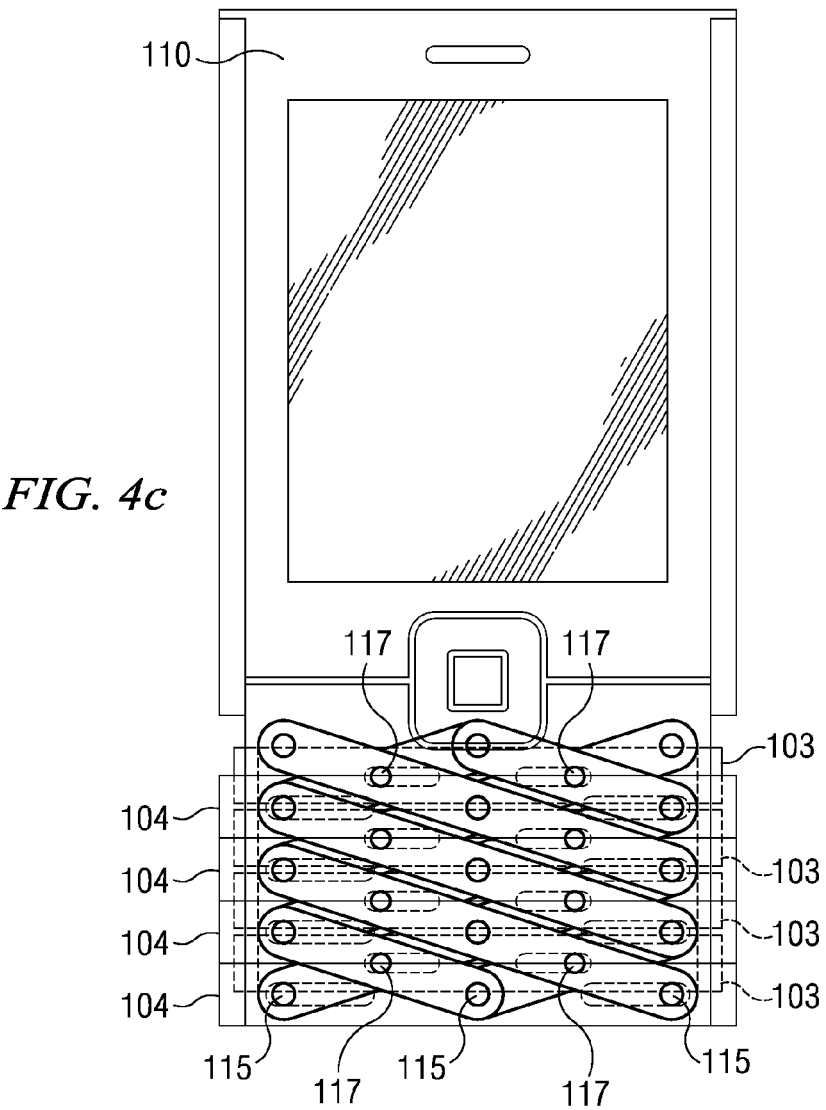
FIG. 4c presents a partial x-ray view of an extendable mechanism according to the embodiment of FIG. 4a in a closed or retracted configuration.

FIG. 4b presents a perspective view of an extendable mechanism according to the embodiment of FIG. 4a, viewed from the rear. In the Figure, like reference numbers are used to identify elements of the structure already discussed in connection with FIG. 4a. Viewing the structure from the rear or underside, it can be seen that the second set of arm-like elements 114a-114e, which form the lower layer of the grid, also have rearward directed protrusions 119 located on their undersides. In the illustrated embodiment, a rearward directed protrusion 119 is located at each pivot point, behind the location of each axle 115 and protrudes in the opposite direction to the axle 115. In the illustrated embodiment, the rearward directed protrusions are substantially cylindrical and are formed as an integral part of (or alternatively are rigidly attached to) the rear of the arm-like elements 114a-114e of the second set. In an embodiment of the invention, the rearward directed protrusions may be formed by extending the axles 115 through the arm-like elements 114a-114e of the second set, so that they protrude rearward by a predetermined amount. In some embodiments the rearward directed protrusions may be hemispherical.

The rearward directed protrusions 119 facilitate transfer of force/pressure associated with a key press to a keypress detection unit (not illustrated), located behind/under the extendable mechanism 108, for example in the second assembly 120 of the electronic device 100. The keypress detection unit may take the form of an array of electromechanical sensors, which convert a mechanical force associated with a keypress into an electrical signal, indicating that a particular key has been pressed. In an embodiment of the invention, the keypress detection unit may take the form of a dome sheet. A dome sheet may be formed, for example, from a thin sheet of flexible electrically insulting material comprising embedded electrical contact pairs distributed to form an array across the sheet. In response to a mechanical force/pressure applied to a particular location on the surface of the sheet, a corresponding contact pair may be caused to deflect, thereby making an electrical contact and registering a "keypress".

In embodiments of the invention, the electromechanical sensors of the keypress detection unit may be configured so as to substantially correspond in position with the axle positions of the extendable mechanism 108 when in an extended position, for example corresponding to a fully open position of electronic device 100. In this position, the rearward directed protrusions 119 are, for example, configured to make mechanical contact with specific ones of the electromechanical sensors provided in the keypress detection unit. Thus, when a key-row 104 is pressed at a certain location, the force applied to the surface of the key-row will be transmitted e.g. through the coupling between the nearest axle 115 and the key-rows 104, and applied to a corresponding electromechanical sensor of the keypress detection unit via the rearward directed protrusion 119 associated with the axle 115 in question. Thus, the axle 115 effectively work as a "plunger" transmitting the force of a key press to an electromechanical sensor of the keypress detection unit, resulting in activation of the sensor and corresponding detection of the keypress.

When the electronic device 100 is in a substantially closed position, the axle positions of the extendable mechanism 108 may not correspond with the locations of the electromechanical sensors and thus any keypress made when the electronic device is in this position, will not result in activation of a corresponding electromechanical sensor and thus will not be registered. The electronic device may be configured so that the same is true when the electronic device 100 is in an intermediate position between the fully closed and fully open positions. This may have the technical effect of providing a keyboard "locking" function, such that e.g. accidental keypresses made when the electronic device 100 is in a substantially closed position will not lead to mis-operation of the device.

FIGS. 4c, 4d, 4e and 4f provide further illustration of the extendable mechanism 108 described in connection with FIGS. 4a and 4b. More specifically, FIG. 4c presents a partial x-ray view of an extendable mechanism according to the embodiment of FIG. 4a in a closed or retracted configuration. The x-ray view reveals the grooves 109a provided in the rear surfaces of the key-rows 104 and how they are dimensioned to match substantially with the diameter of the axles 115, so that the axles 115 fit into the grooves 109a. In the illustrated embodiment, the grooves 109a are dimensioned so that the fit between the axles 115 and the grooves 109a is close, but sliding movement of the axles 115 within the grooves 109a is possible. In alternative embodiments the dimensions of the grooves 109a and/or the axles 115 may be configured to provide a greater or lesser degree of friction between them. Similarly, the x-ray view of FIG. 4c also reveals the grooves 109b provided in the rear surfaces of the key graphic panes 103. Grooves 109b are dimensioned to match substantially with the diameter of the further protrusions 117, so that the further protrusions 117 fit into the grooves 109b. In the illustrated embodiment, the grooves 109b are dimensioned so that the fit between the further protrusions 117 and the grooves 109b is close, but sliding movement of the further protrusions 117 within the grooves 109b is possible. In alternative embodiments the dimensions of the grooves 109b and/or the further protrusions 117 may be configured to provide a greater or lesser degree of friction between them.

Figure 4D:
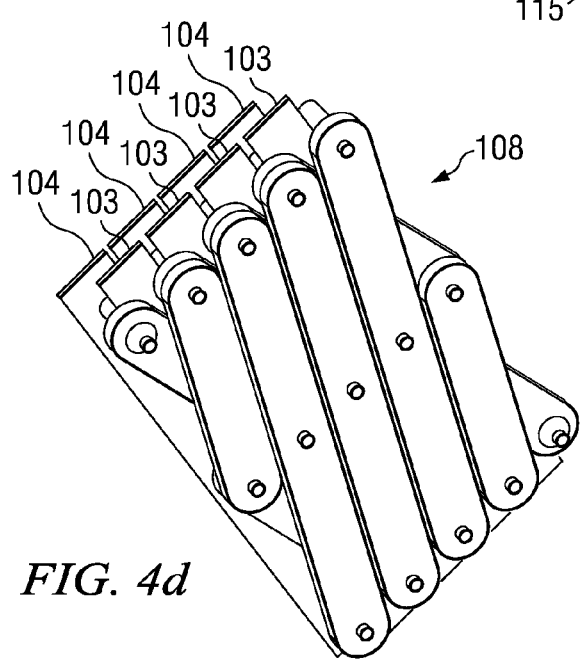
FIG. 4d presents a perspective view of an extendable mechanism according to the embodiment of FIG. 4a, in a closed or retracted configuration, viewed from the rear.
Figure 4E:
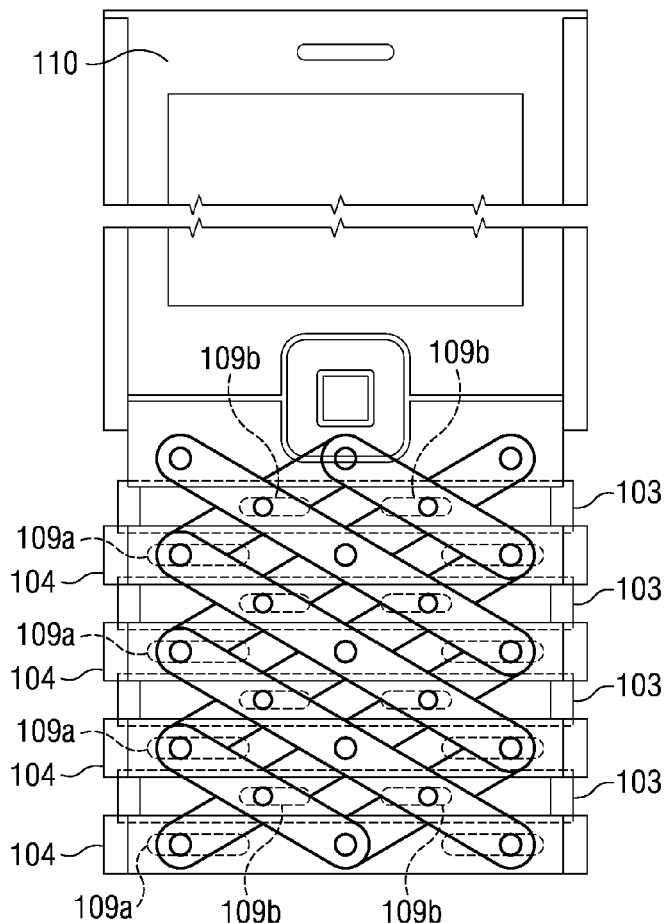
FIG. 4e presents a partial x-ray view of an extendable mechanism according to the embodiment of FIG. 4a in an open or extended configuration.

FIG. 4d presents a perspective view of an extendable mechanism according to the embodiment of FIG. 4a, in a closed or retracted configuration, viewed from the rear. This view illustrates, in particular, how the key graphic panes 103 are covered by the key-rows 104 when the extendable mechanism 108 is in the closed or retracted configuration.

FIG. 4e presents a partial x-ray view of an extendable mechanism according to the embodiment of FIG. 4a in an open or extended configuration. As in FIG. 4c, the coupling between the grooves 109a and axles 115 can be seen, as well as the coupling between the grooves 109b and the further protrusions 117. Additionally, by comparing FIG. 4e with FIG. 4c, it can be appreciated that as the extendable mechanism 108 is extended from the closed or retracted configuration shown in FIG. 4c to the open or extended configuration of FIG. 4e, the axles 115 and further protrusions 117 slide in their respective grooves 109a, 109b. The direction of sliding is substantially perpendicular to the axis (A-A) along which the extendable mechanism 108 is extended.

Figure 4F:
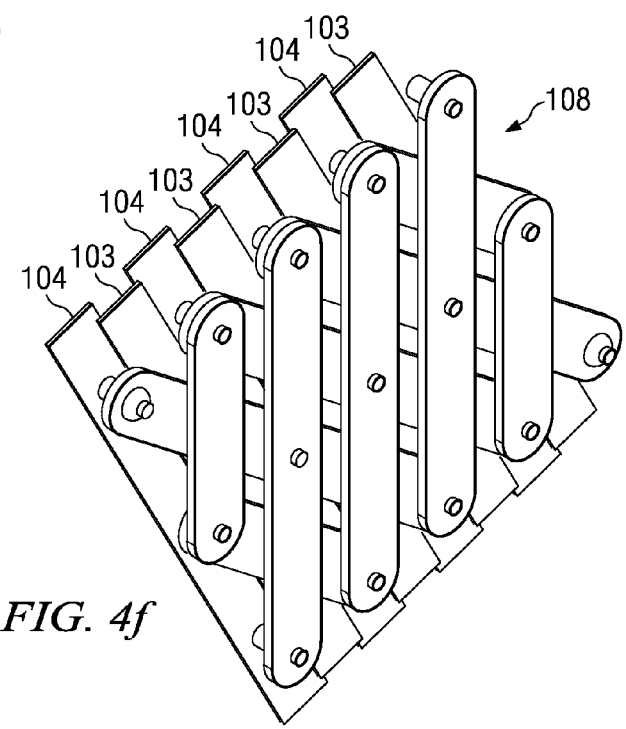
FIG. 4f presents a perspective view of an extendable mechanism according to the embodiment of FIG. 4a, in an open or extended configuration, viewed from the rear.

FIG. 4f presents a perspective view of an extendable mechanism according to the embodiment of FIG. 4a, in an open or extended configuration, viewed from the rear. This view illustrates, in particular, how the key graphic panes 103 are revealed from behind the key-rows 104 when the extendable mechanism 108 is in the open or extended configuration.

In an embodiment of the invention, extendable mechanism 108 may be configured to provide a certain amount of resistance when being operated. This may have the technical effect of providing smoothed or damped operation when extending the electronic device 100 from a substantially closed position to a substantially open position and/or when closing the device. Intermediate positions between the fully retracted and fully extended positions may also be provided for. In embodiments where the extendable mechanism is a scissor-type grid mechanism as described in connection with FIGS. 1 and 4, resistance to operation of the mechanism may be provided, for example, by using axles 115 having a friction surface. In alternative embodiments, the resistive effect may be achieved by using a friction surface in the second assembly 120 of the electronic device to provide resistance to operation of the extendable mechanism 108. In an alternative embodiment, the resistive effect may be achieved by using different materials in the corresponding parts of the extendable mechanism 108 and the second assembly 120, or by using different materials in the first and second sets of arm-like elements 113a-113e, 114a-114e of the extendable mechanism 108. The materials may be any of those mentioned earlier in the description but are not limited to those materials. The different materials may comprise, for example, organic materials for example wood or leather and for example a precious metal. If the organic material has a relatively rough surface and the precious metal has a relatively smooth surface a resistive force may be achieved. In alternative embodiments, intermediate positions may be provided by using e.g. stoppers or blocks in the second assembly 120 of electronic device 100 to obtain a stepped operation of the extendable mechanism. The total extension of the extendable mechanism may also be limited, for example, by the inclusion of a stop in the second assembly 120.

Figure 5:
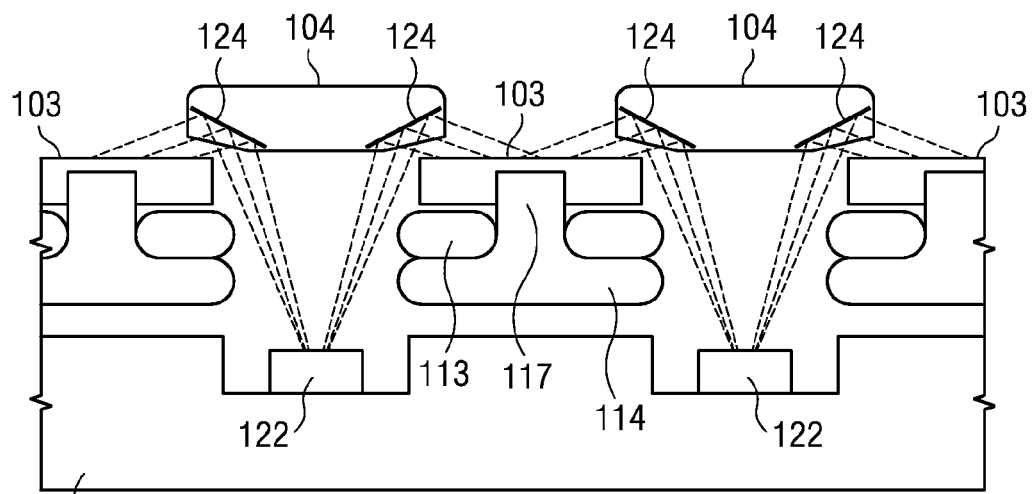
FIG. 5 is a cross-section through an electronic device comprising an extendable mechanism according to an embodiment of the invention and a corresponding illumination system.

FIG. 5 is a cross-section through an electronic device 100 comprising an extendable mechanism according to an embodiment of the invention and a corresponding illumination system. In the illustrated embodiment, illuminating elements 122, for example light emitting diodes (LEDs) are placed behind/under the extendable mechanism 108 and are used to illuminate the key graphic panes 103 when the electronic device is in an open or extended configuration. In alternative embodiments, any other suitable source of illumination may be used in place of LEDs.

As can be seen from the Figure, in the illustrated embodiment, the illuminating elements are located in recesses located in the second assembly 120 of the electronic device 100. In the illustrated embodiment, the illuminating elements 122 are positioned so that they line up with, e.g. lie substantially directly under, the key rows 104, when the electronic device 100 is in the open or extended configuration. In other embodiments, an alternative location may be chosen for the illuminating elements 122. In the illustrated embodiment, the underside of the key-rows 104 is provided with a reflective surface or surfaces 124. The reflective surface(s) are configured to direct incident light coming from the illuminating elements 122 onto the upper surface of the key graphic panes 103. The reflective surfaces may be formed by shaping, e.g. by providing an angled surface on the underside of the key-rows, appropriately to direct the light from the illuminating elements 122 onto the key graphic panes 103. The reflective surface(s) 124 may be polished to a highly reflective finish or alternatively, in other embodiments, special reflective elements may be attached to the angled surface. Casting light onto the key graphic panes 103 from the underside of the key-rows may create a special illumination effect, when the extendable mechanism 108 is extended into an open position. Furthermore, illumination of the key graphic panes 103 has the technical effect of improving the visibility of the key graphics in reduced light conditions. This tends to improve the overall usability of the electronic device 100. In an embodiment of the invention, activation of the illumination system for the key graphic panes 103 may be linked to an ambient light sensor such that the illumination system is activated adaptively according to the prevailing light conditions.

In an example embodiment, the electronic device 100 may comprise an antenna (or multiple antennas) in operable communication with a transmitter and a receiver. The electronic device 100 may further comprise a controller or other processing element that may provide a signal to and may receive a signal from the transmitter and receiver, respectively. It is understood that the controller may comprise circuitry desirable for implementing audio and logic functions of the electronic device 100. For example, the controller may be comprised of a digital signal processor device, a microprocessor device, and various analogue to digital converters, digital to analog converters, and other support circuits. Control and signal processing functions of the electronic device 100 may be allocated between these devices according to their respective capabilities. The controller thus may also comprise the functionality to convolutionally encode and interleave message and data prior to modulation and transmission. The controller can additionally include an internal voice coder, and may include an internal data modem. Further, the controller may comprise functionality to operate one or more software programs, which may be stored in memory. For example, the controller may be capable of operating a connectivity program, such as a conventional web browser. The connectivity program may then allow the electronic device to transmit and receive web content, such as location-based content and/or other web page content, according to a wireless application protocol (WAP), hypertext transfer protocol (HTTP) and/or the like, for example.

The signal may comprise signaling information in accordance with the air interface standard of the applicable cellular or non-cellular system, and also user speech, received data and/or user generated data. In this regard, the electronic device 100 is capable of operating with one or more air interface standards, communication protocols, modulation types, and access types. The electronic device 100 is capable of operating in accordance with any of a number of first, second, third and/or fourth-generation communication protocols and/or the like. For example, the electronic device 100 may be capable of operating in accordance with second-generation (2G) wireless communication protocols, for example IS-136 (time division multiple access (TDMA)), the global system for mobile communications (GSM) and IS-95 (CDMA (code division multiple access)), or with third-generation (3G) wireless communication protocols, such as universal mobile telecommunications system (UMTS), code division multiple access (CDMA2000), wideband code division multiple access (WCDMA) and time division-synchronous time code division multiple access (TD-SCDMA) or with fourth-generation (4G) wireless communication protocols or the like. The electronic device may be capable of operating in accordance with some non cellular protocols for example wireless local area network (WLAN), Bluetooth (BT), global positioning system (GPS), infrared (IR) and/or the like.

The electronic device may also comprise a user interface including an output device such as a conventional earphone or speaker, a ringer, a microphone, a display, and a user input interface, all of which are coupled to the controller. The user input interface, which allows the electronic device to receive data, may include any of a number of devices allowing the electronic device 100 to receive data, such as a keypad, a touch display (not shown) or other input device. In embodiments including the keypad, the keypad may include the conventional numeric (0-9) and related keys (#, *), and other keys used for operating the electronic device 100. Alternatively, the keypad may include a conventional QWERTY keypad arrangement. The keypad may also include various soft keys with associated functions. In addition, or alternatively, the electronic device may include an interface device such as a joystick or other user input interface. The electronic device may further comprise a battery, such as a vibrating battery pack, for powering various circuits that are required to operate the electronic device, as well as optionally providing mechanical vibration as a detectable output. In addition, the electronic device may include a positioning sensor. The positioning sensor may include, for example, a global positioning system (GPS) sensor, an assisted global positioning system (Assisted-GPS) sensor, etc. In an example embodiment, the positioning sensor comprises a pedometer or inertial sensor. In this regard, the positioning sensor may be capable of determining a location of the electronic device, such as, for example, longitudinal and latitudinal directions of the electronic device, or a position relative to a reference point such as a destination or start point. Information from the positioning sensor may then be communicated to a memory of the electronic device or to another memory device to be stored as a position history or location information.

The electronic device 100 may further comprise a user identity module (UIM). The UIM is according to one example a memory device having a processor built in. The UIM may include, for example, a subscriber identity module (SIM), a universal integrated circuit card (UICC), a universal subscriber identity module (USIM), a removable user identity module (R-UIM), etc. The UIM may store information elements related to a mobile subscriber. In addition to the UIM, the electronic device may be equipped with memory. For example, the electronic device may include volatile memory, such as volatile random access memory (RAM) comprising a cache area for the temporary storage of data. The electronic device may also comprise other non-volatile memory, which can be embedded and/or may be removable. The non-volatile memory can alternatively comprise an electrically erasable programmable read-only memory (EEPROM), flash memory or the like. The memories can store any of a number of pieces of information, and data, used by the electronic device 100 to implement the functions of the electronic device 100. For example, the memories can include an identifier, such as an international mobile equipment identification (IMEI) code, capable of uniquely identifying the electronic device 100. Furthermore, the memories may store instructions for determining cell ID information. Specifically, the memories may store an application program for execution by the controller, which may determine an identity of the current cell, for example, cell ID identity or cell ID information, with which the mobile terminal is in communication. In conjunction with the positioning sensor, the cell id information may be used to more accurately determine a location of the electronic device.

Without in any way limiting the scope, interpretation, or application of the claims appearing below, it is possible that a technical effect of one or more of the example embodiments disclosed herein may be to provide a new form factor between a monoblock device and a slide device. Another possible technical effect of one or more of the example embodiments disclosed herein may be to offer a new look for an electronic device 100 and new styling potential when the electronic device 100 is in a closed position and the key graphic panels 102 are hidden. Another technical effect of one or more of the example embodiments disclosed herein may be the shorter overall size when compared with earlier monoblock, slide or so-called "pop-up" devices.

Although various aspects of the invention are set out in the independent claims, other aspects of the invention comprise any combination of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
a first assembly and a second assembly, said first assembly being connected to said second assembly by an extendable mechanism, said extendable mechanism being configured to extend an input area when the first assembly is moved with respect to the second assembly from a first position to a second position, the extendable mechanism comprising key graphic panes corresponding to keys of more than one adjacent key row for user input,
wherein the extendable mechanism comprises a first set of diagonally opposing interconnected arms and a second set of diagonally opposing interconnected arms, said first and second sets of diagonally opposing arms comprising two layers of substantially parallel arms, and
wherein the movement from the first position to the second position causes the more than one adjacent key row to one of separate or move closer together in order to at least in part reveal or conceal the key graphic panes; and
wherein at least a part of a surface of the more than one adjacent key row is transparent and the key graphic panes are substantially visible through the transparent surface when the extendable mechanism is in the first position.

2. An apparatus according to claim 1, wherein the apparatus is a mobile device.

3. An apparatus according to claim 1, wherein the more than one adjacent key row is configured for relative movement with respect to each other when the extendable mechanism is moved from the first position to the second position.

4. An apparatus according to claim 3, wherein at least one of said more than one adjacent key row comprises a reflective surface beneath it configured to reflect light from an illuminating element onto a corresponding key graphic when the apparatus is in the second position.

5. An apparatus according to claim 3, wherein the graphic panes are configured for relative movement with respect to the more than one adjacent key row when the extendable mechanism is moved from the first position to the second position, such that in the first position the key graphic panes are substantially covered by the more than one adjacent key row and in the second position the key graphic panes are substantially uncovered.

6. An apparatus according to claim 1, wherein said apparatus comprises a keyboard.

7. The apparatus according to claim 1, wherein the two layers of substantially parallel arms are movably connected by axles and wherein the axels are configured with plungers to transmit a force by a user to at least one of the key graphic panes for the user input.

* * * * *

UNITED STATES PATENT AND TRADEMARK OFFICE
CERTIFICATE OF CORRECTION

| | | |
|---|---|---|
| PATENT NO. | : 8,591,128 B2 | Page 1 of 1 |
| APPLICATION NO. | : 12/580099 | |
| DATED | : November 26, 2013 | |
| INVENTOR(S) | : Nikolaj Heiberg Bestle and Teppo Tapani Jokinen | |

It is certified that error appears in the above-identified patent and that said Letters Patent is hereby corrected as shown below:

In the Claims:

In Claim 7:
Column 13, line 8, "axels" should be delete and --axles-- should be inserted.

Signed and Sealed this
Eleventh Day of February, 2014

Michelle K. Lee
*Deputy Director of the United States Patent and Trademark Office*